United States Patent
Hisada et al.

(10) Patent No.: US 10,267,905 B2
(45) Date of Patent: Apr. 23, 2019

(54) MEASURING METHOD FOR MEASURING LASER SCANNING VELOCITY

(71) Applicant: Toyota Jidosha Kabushiki Kaisha, Toyota-shi (JP)

(72) Inventors: Kohei Hisada, Nagoya (JP); Daisuke Asami, Toyota (JP); Ko Nakamura, Nagoya (JP); Kazuyuki Ogusu, Okazaki (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 260 days.

(21) Appl. No.: 14/856,862

(22) Filed: Sep. 17, 2015

(65) Prior Publication Data

US 2016/0091600 A1    Mar. 31, 2016

(30) Foreign Application Priority Data

Sep. 25, 2014    (JP) ................... 2014-195098

(51) Int. Cl.
| | |
|---|---|
| *G01S 11/14* | (2006.01) |
| *G01S 15/58* | (2006.01) |
| *G01H 3/06* | (2006.01) |

(52) U.S. Cl.
CPC ............... *G01S 11/14* (2013.01); *G01H 3/06* (2013.01); *G01S 15/586* (2013.01)

(58) Field of Classification Search
CPC ........ B23K 26/03; B23K 26/082; G01H 3/06; G01S 11/14; G01S 15/586
USPC .......... 702/142; 73/597, 646, 657; 342/26 R; 356/486
See application file for complete search history.

(56) References Cited

U.S. PATENT DOCUMENTS

| | | | | |
|---|---|---|---|---|
| 4,655,086 A | * | 4/1987 | Mielnicka-Pate | ........ G01H 9/00 367/178 |
| 5,033,304 A | * | 7/1991 | Rosen | ..................... G01N 29/07 73/597 |
| 6,480,142 B1 | * | 11/2002 | Rubin | .................... G01S 13/951 342/26 R |
| 7,477,398 B2 | * | 1/2009 | Lal | ......................... G01H 9/002 356/486 |
| 2001/0032514 A1 | * | 10/2001 | Maruyama | ............... G01H 9/00 73/657 |
| 2002/0012442 A1 | * | 1/2002 | Azima | .................... H04R 7/045 381/431 |

(Continued)

FOREIGN PATENT DOCUMENTS

| | | |
|---|---|---|
| CN | 102141543 A | 8/2011 |
| CN | 202576563 U | 12/2012 |

(Continued)

*Primary Examiner* — Mohammed Shamsuzzaman
(74) *Attorney, Agent, or Firm* — Oblon, McCelland, Maier & Neustadt, L.L.P.

(57) ABSTRACT

Provided is a measuring method for measuring laser scanning velocity for a laser beam machining apparatus. The laser beam machining apparatus includes a mirror, and is configured to process a work by irradiating laser. The laser is irradiated by operating the mirror. The measuring method includes measuring processing sound of the work by the laser using the laser beam machining apparatus. Further, the measuring method includes calculating scanning velocity of the laser by analyzing a frequency of the measured processing sound using the laser beam machining apparatus.

4 Claims, 5 Drawing Sheets

(56) References Cited

U.S. PATENT DOCUMENTS

2014/0307096 A1* 10/2014 Park .................. G08B 13/1672
348/152

FOREIGN PATENT DOCUMENTS

| JP | 62-114786 | 5/1987 |
| JP | 2005-138160 A | 6/2005 |
| JP | 2011-147500 A | 8/2011 |
| JP | 2012-256062 | 12/2012 |

* cited by examiner

F I G . 1
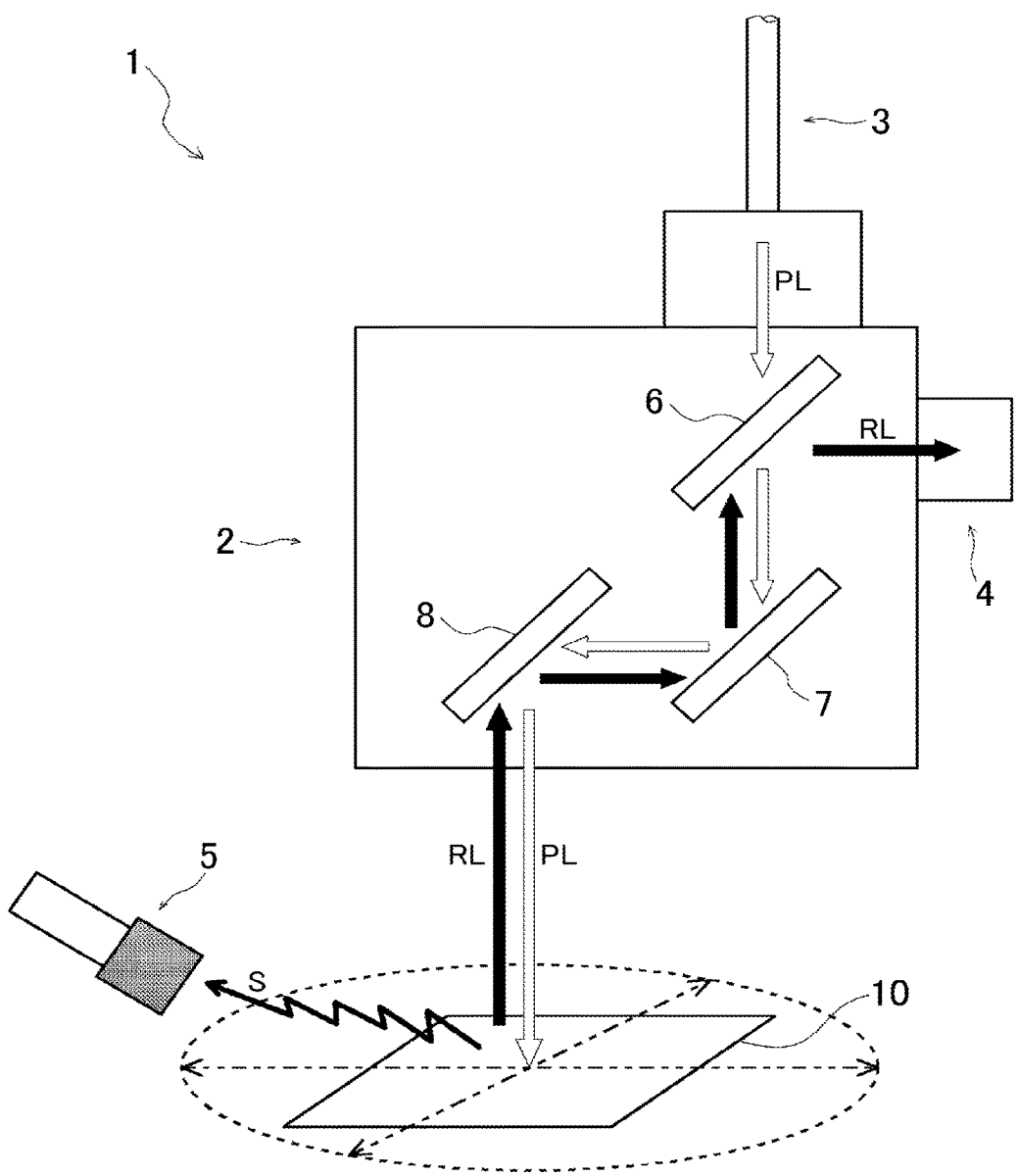

MEASURING METHOD FOR MEASURING LASER SCANNING VELOCITY

INCORPORATION BY REFERENCE

The disclosure of Japanese Patent Application No. 2014-195098 filed on Sep. 25, 2014 including the specification, drawings and abstract is incorporated herein by reference in its entirety.

BACKGROUND OF THE INVENTION

1. Field of the Invention

The invention relates to a technology related to a method for measuring laser scanning velocity.

2. Description of Related Art

In recent years, a hot stamp material has been applied more widely. In a hot stamp material, an oxide film is formed on a surface of a steel plate by performing hot forming. Since an oxide film is a factor for deteriorating adhesion of paint, it is necessary to remove an oxide film on a surface. As a method for removing an oxide film formed on a surface of a hot stamp material, a surface treatment technology using pulsed laser is known. In the surface treatment technology using pulsed laser, factors for deciding processing conditions include a laser energy amount per pulse, oscillation frequency of laser, and laser scanning velocity.

Inspection equipment that is used for a processing technology using a laser includes, for example, the one described in Japanese Patent Application Publication No. 62-114786 (JP 62-114786 A) stated below, which is publicly known. The inspection equipment described in JP 62-114786 A detects sound during processing to inspect a processing state. In such equipment, since head scanning velocity and head moving velocity are the same, the laser scanning velocity is easily detected by detecting the head moving velocity.

Meanwhile, as a laser beam machining apparatus, there is one described in Japanese Patent Application Publication No. 2012-256062 (JP 2012-256062 A) stated below, having a structure in which a laser irradiation head is not displaced. In the laser beam machining apparatus disclosed in JP 2012-256062 A, since a mirror operates inside the irradiation head, laser scanning is performed without displacing the irradiation head itself.

SUMMARY OF THE INVENTION

In a case where a type of the laser beam machining apparatus disclosed in JP 2012-256062 A is used, because the irradiation head is not displaced, it is difficult to measure laser scanning velocity.

The invention provides a measuring method that enables measurement of laser scanning velocity in a laser beam machining apparatus structured so that laser scanning is performed by an operation of a mirror.

An aspect of the invention is a measuring method for measuring laser scanning velocity for a laser beam machining apparatus. The laser beam machining apparatus includes a mirror, and is configured to process a work by irradiating laser. The laser is irradiated by operating the mirror. The measuring method includes measuring processing sound of the work by the laser using the laser beam machining apparatus. Further, the measuring method includes calculating the laser scanning velocity by analyzing a frequency of the measured processing sound using the laser beam machining apparatus.

In the above-mentioned aspect, the laser scanning velocity may be measured by using the laser beam machining apparatus that is structured to scan with laser by operating the mirror.

In the above aspect, the laser beam machining apparatus may be configured to calculate the laser scanning velocity based on a frequency shift amount of the processing sound caused by a Doppler effect.

In the foregoing aspect, the laser beam machining apparatus may be configured to perform averaging processing of the processing sound. The frequency of the processing sound is analyzed.

In the foregoing aspect, the laser scanning velocity is measured highly accurately by using the laser beam machining apparatus that is structured to scan with laser by operating the mirror.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a schematic view showing an entire structure of a laser beam machining apparatus that realizes a method for measuring laser scanning velocity according to an embodiment of the invention;

DETAILED DESCRIPTION OF EMBODIMENTS

Figure 2A:
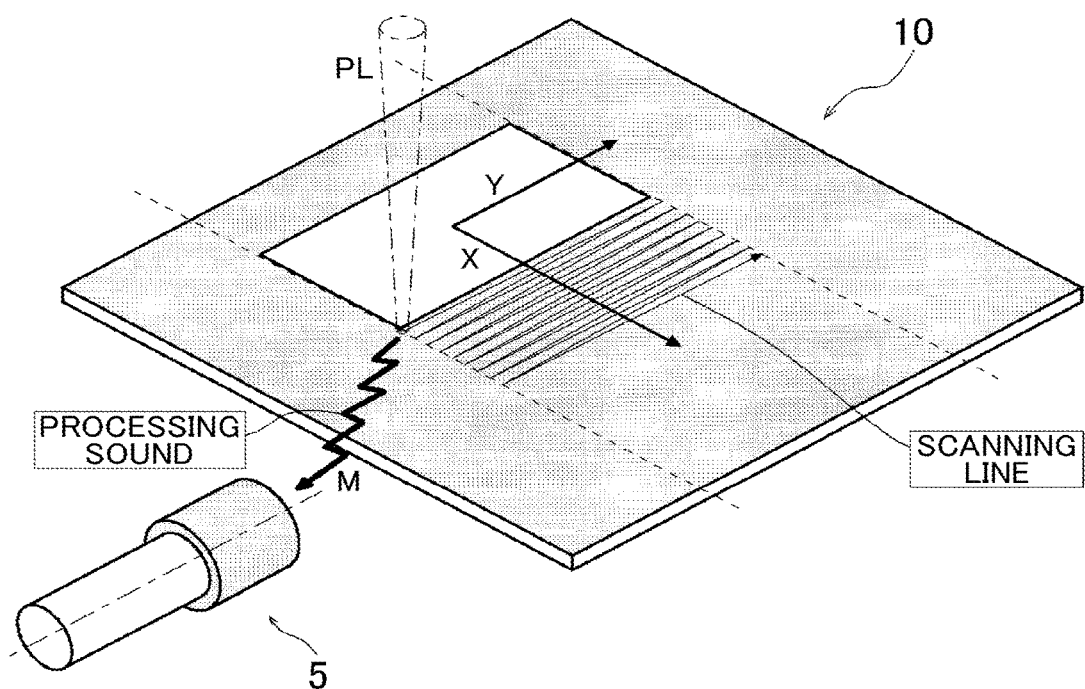
FIG. 2A is a schematic perspective view showing a state of measurement of processing sound in the method for measuring laser scanning velocity according to the embodiment of the invention.

Next, an embodiment of the invention is explained. First of all, an entire structure of a laser beam machining apparatus, to which a method for measuring laser scanning velocity according to the embodiment of the invention is applied, is explained using FIG. 1 and FIG. 5. As shown in FIG. 1, a laser beam machining apparatus 1 is an apparatus for processing a work 10 by irradiating pulsed laser PL, and is structured by including a scanner 2, an optical fiber 3, a light-receiving element (power meter) 4, and a microphone 5. The scanner 2 (a so-called galvano scanner) includes a plurality of mirrors 6, 7, 8, and, of them, the mirrors 7, 8 (so-called galvano mirrors) are structured to be able to rotate about different axes from each other. The scanner 2 is structured to scan with pulsed laser PL as the mirrors 7, 8 are operated. In short, the laser beam machining apparatus 1 is structured so as to perform scanning with the pulsed laser PL irradiated from the scanner 2 without displacing the scanner 2 itself.

Figure 5:
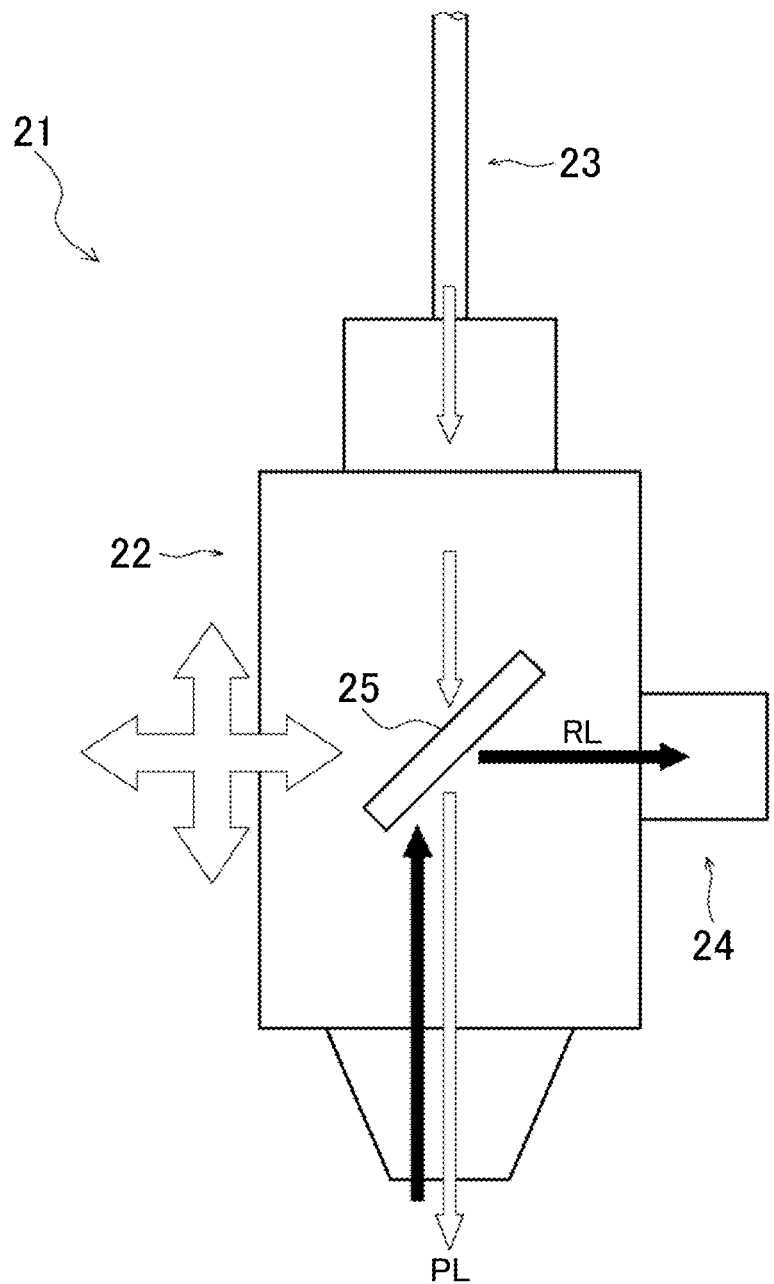
FIG. 5 is a schematic view showing a laser beam machining apparatus (a type in which an irradiation head is displaced).

Meanwhile, FIG. 5 shows an entire structure of a laser beam machining apparatus to which the invention is not applied. As shown in FIG. 5, a laser beam machining apparatus 21 is an apparatus that irradiates pulsed laser PL, and is structured by including an irradiation head 22, an optical fiber 23, a light-receiving element (power meter) 24, a mirror 25, and so on. The laser beam machining apparatus 21 is structured to perform scanning with the pulsed laser PL by displacing the irradiation head 22 itself from front to back and from side to side. Therefore, the laser beam machining apparatus 21 having the above-mentioned structure, scanning velocity of the pulsed laser PL is measured easily by observing displacement of the irradiation head 22.

The method for measuring laser scanning velocity according to the embodiment of the invention makes it possible to measure scanning velocity of pulsed laser PL in a case where a type of the laser beam machining apparatus 1 is used, in which scanning is performed with pulsed laser PL by operations of the mirrors 7, 8, not in a case where a type of the laser beam machining apparatus 21 is used, in which the irradiation head 22 is displaced.

Operations of the laser beam machining apparatus 1 are explained with reference to FIG. 1 to FIG. 4. As shown in FIG. 1, the mirror 6 that structures the scanner 2 is a half mirror. The pulsed laser PL, which is generated from a laser source (not shown) and incident through the optical fiber 3, transmits through the mirror 6, is reflected by the mirrors 7, 8, and is irradiated on the work 10. An irradiation position of the pulsed laser PL on the work 10 is changed depending on operations of the mirrors 7, 8, and the pulsed laser PL is scanned along a zigzag scanning line as shown in FIG. 2A and FIG. 2B.

As shown in FIG. 1, reflected light RL of the pulsed laser PL irradiated on the work 10 is reflected by the mirrors 8, 7, 6, and is incident on the light-receiving element 4.

Figure 2B:
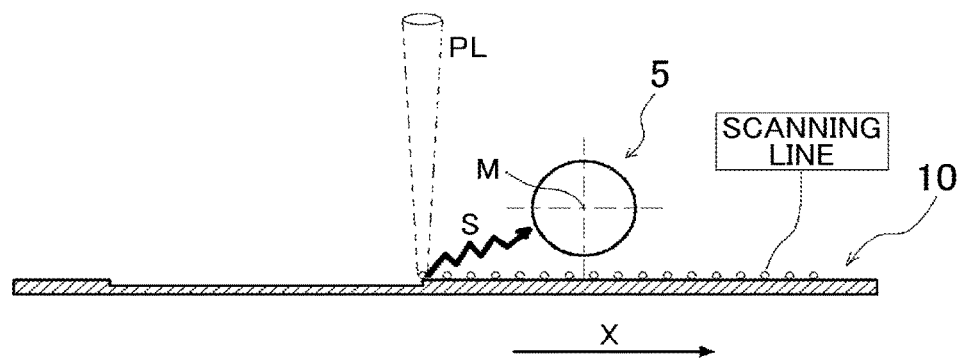
FIG. 2B is a side schematic view showing a state of measurement of processing sound in the method for measuring laser scanning velocity according to the embodiment of the invention.

As the pulsed laser PL is irradiated, a surface layer (for example, an oxide film) of the work 10 is removed as shown in FIG. 2A and FIG. 2B. The pulsed laser PL is irradiated so as to draw the zigzag scanning line that swings in direction Y perpendicular to a surface layer processing direction X.

The microphone 5 is arranged so that an axis direction M of the microphone 5 is parallel to the direction Y, which is a swinging direction of the scanning line of the pulsed laser PL. The microphone 5 is structured so as to be affected by the Doppler effect most remarkably by reciprocating the irradiation position (processing position) of the pulsed laser PL.

Figure 3:
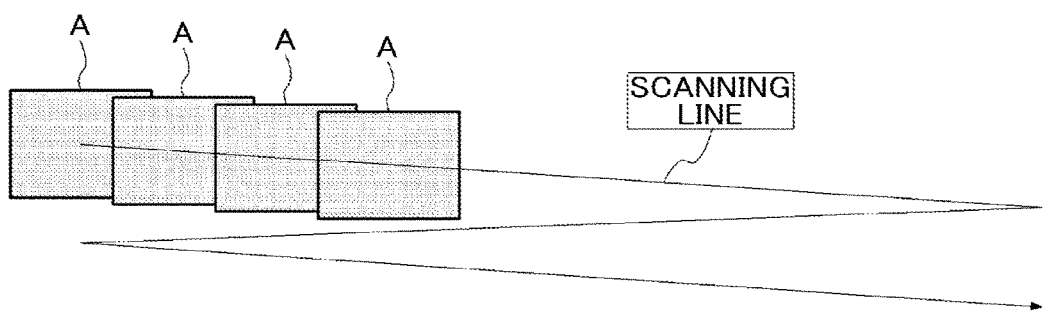
FIG. 3 is a view showing an irradiation state of pulsed laser (an overlapping state of laser per pulse)

As shown in FIG. 3, the pulsed laser PL performs processing by being irradiated at a set intensity on an irradiation range A for irradiation of one pulse, and thereby giving the irradiation range A given energy. Then, in irradiation of the next one pulse, the irradiation position is shifted, and then given energy is given to the next irradiation range A.

Figure 4A:
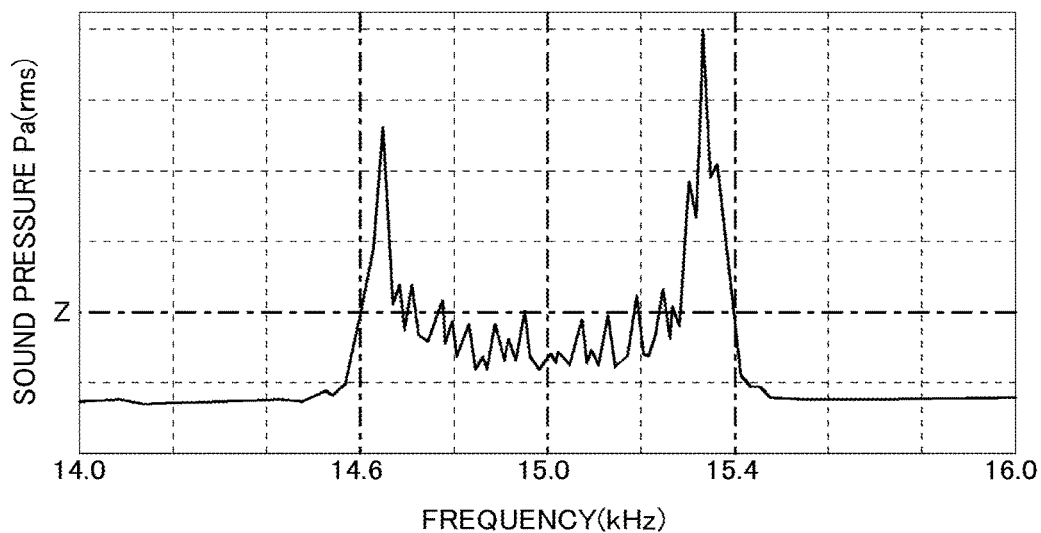
FIG. 4A is a view showing a frequency analysis result of processing sound, out of views showing processing sound measurement results in the method for measuring laser scanning velocity according to the embodiment of the invention.
Figure 4B:
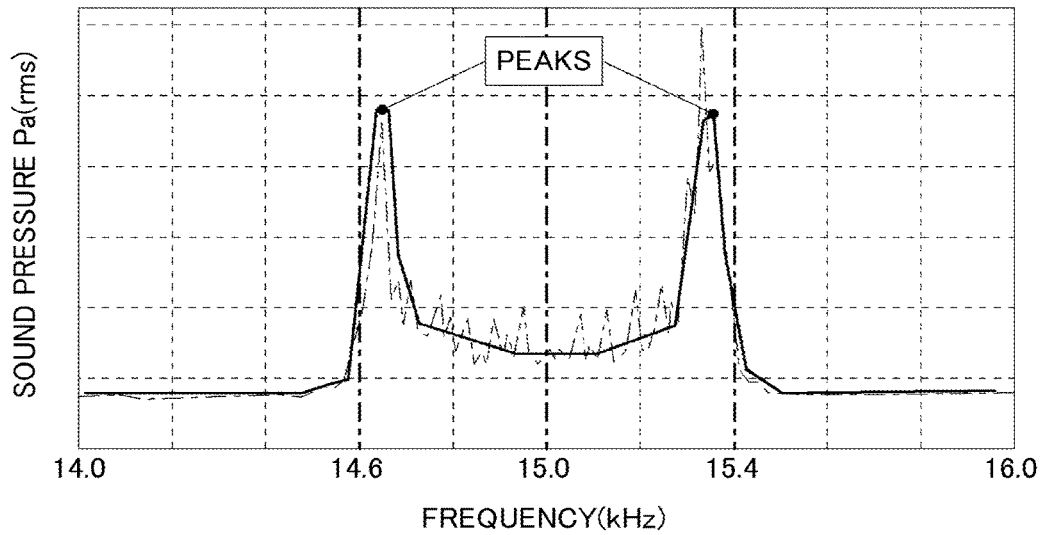
FIG. 4B is a view showing a result after averaging processing, out of the views showing processing sound measurement results in the method for measuring laser scanning velocity according to the embodiment of the invention.

Next, experimental results of measurement of processing sound by using the laser beam machining apparatus 1 are explained by using FIG. 4A and FIG. 4B. In this experiment, nanosecond pulsed laser was used in a laser source, and an oxide film on a surface of the work 10, which is a hot stamp material, was removed in a state at room temperature of 20 C°. Processing sound then was measured by the microphone 5. The measurement was carried out in a state where oscillation frequency (processing frequency) of the nanosecond pulsed laser was set to 15.0 kHz, scanning velocity of the pulsed laser PL was set to 9 m/s, and the microphone 5 was fixed (zero velocity).

Then, in this experiment, it was confirmed that scanning velocity calculated based on the frequency analysis result coincided with actual scanning velocity with high accuracy. Thus, it was confirmed that calculation of scanning velocity based on processing sound measurement was effective.

It is possible to calculate a frequency shift amount $\Delta f$ of measured processing sound in the Doppler effect by using $\Delta f = f(V1-V0)/(V-V1)$, in which sound velocity is V, oscillation frequency is f, moving velocity of an observer is V0, and moving velocity of a sound source is V1. In this experiment, sound velocity V was corrected (with Euler's series) as $V=331.5+0.6t$ (t: room temperature). It is preferred that a suitable correction formula for the sound velocity V is employed as appropriate in accordance with an atmosphere as the measurement condition.

In the experiment conditions, the mathematical frequency shift amount $\Delta f$ obtained from calculation using the above-stated numerical formula is 0.4 kHz, and it is thus estimated that frequencies after frequency shift of measured processing sound (herein after, referred to as shift frequency) are 14.6 kHz and 15.4 kHz.

FIG. 4A shows a result of frequency analysis of processing sound S that is measured by the microphone 5 when the work 10 is processed by the pulsed laser PL. According to FIG. 4A, when frequency, at which sound pressure of the processing sound S becomes a given value Z or larger, is determined as a shift frequency, it is possible to read that the shift frequencies are 14.6 kHz and 15.4 kHz. In this case, a mean value of the shift frequencies is 15.0 kHz, and this value coincides with oscillation frequency f of nanosecond pulsed laser.

As stated above, it was confirmed from the experimental result shown in FIG. 4A that the experimental result coincided with the calculation result and the experiment conditions with high accuracy. In short, it was confirmed that scanning velocity of pulsed laser PL was calculated highly accurately based on the calculating formula for the frequency shift amount $\Delta f$ with the use of the measurement result of the processing sound S.

In the foregoing embodiment, the frequency, at which sound pressure of processing sound S exceeds the given value Z, is determined as a shift frequency. However, the frequency analysis result of processing sound S may be averaged, and a frequency, at which a peak of sound pressure appears, may be used. FIG. 4B shows a result of frequency analysis of processing sound S that is measured by using the microphone 5 when the work 10 is processed by pulsed laser PL, and a result of averaging processing of the frequency analysis.

According to FIG. 4B, peaks of the sound pressure of the processing sound S generally coincide with 14.6 kHz and 15.4 kHz that are shift frequencies according to calculation. This means that it is also possible to calculate scanning velocity of pulsed laser PL highly accurately from a calculating formula for a frequency shift amount $\Delta f$ based on not only frequency analysis of processing sound S measured by the microphone 5, but also the result of the averaging processing.

In short, the method for measuring laser scanning velocity according to the embodiment of the invention is a method for measuring laser scanning velocity in a case where work 10 is processed as pulsed laser PL is irradiated in the laser beam machining apparatus 1 having the mirrors 7, 8 that perform laser scanning. The method is for measuring processing sound S of the work 10 by the pulsed laser PL, and calculating scanning velocity V1 of pulsed laser PL by performing frequency analysis of the measured processing sound S.

With this structure, it is possible to measure scanning velocity V1 of pulsed laser PL in the case where the laser beam machining apparatus 1 is used, which has a structure in which an irradiation head does not move, and scanning is performed with pulsed laser PL by operating the mirrors 7, 8.

In the method for measuring laser scanning velocity according to the embodiment of the invention, scanning velocity V of pulsed laser is calculated based on a frequency shift amount Δf of processing sound S in the Doppler effect. Further, in calculating scanning velocity V1 of pulsed laser, processing sound S, frequencies of which are analyzed, are averaged. According to this structure, it is possible to measure scanning velocity V1 of pulsed laser PL highly accurately.

In the method for measuring laser scanning velocity according to the embodiment of the invention, processing sound S is measured and then scanning velocity V1 is calculated. However, with the use of the Doppler effect, it is also possible to calculate scanning velocity V1 by detecting vibration generated in a work, or by detecting reflected light generated during processing, instead of processing sound. In the case of using vibration, a calculation formula relating to vibration transmission through a substance is used. Also, in the case of using light, a calculation formula relating to the Doppler effect in light is used.

The embodiment shows the example of a method for measuring scanning velocity of pulsed laser PL. However, when laser, which is not pulsed laser, is used, it is also possible to measure scanning velocity in the measuring method according to the invention.

What is claimed is:

1. A measuring method for measuring laser scanning velocity for a laser beam machining apparatus, the laser beam machining apparatus including a microphone and a mirror in a scanner, and being configured to process a work by irradiating laser, the laser being a pulsed laser irradiated by operating the mirror, the measuring method comprising:
    measuring processing sound of the work by the laser using the laser beam machining apparatus by arranging the microphone outside a scanning range in a swinging direction of a scanning line of the pulsed laser irradiated by the mirror without displacing the scanner; and
    calculating scanning velocity of the laser by analyzing frequencies of the measured processing sound using the laser beam machining apparatus, the scanning velocity calculated based on a frequency shift amount of the processing sound that is a shift amount of the frequency shifted by a Doppler effect with respect to an oscillation frequency of the pulsed laser,
    wherein the frequency shift amount is calculated based on a frequency of a peak sound pressure measured by the microphone.

2. The measuring method according to claim 1, wherein the laser beam machining apparatus is configured to perform averaging processing of frequencies of the processing sound to determine the frequency of peak sound pressure, the averaging processing averaging sound pressure with respect to the frequency.

3. The measuring method according to claim 1, wherein the microphone is arranged so that an axis direction of the microphone is parallel to the swinging direction of the pulsed laser irradiated by the mirror.

4. The measuring method according to claim 1, wherein the mirror is a plurality of mirrors that rotate around different axes to vary a scanning location of the laser.

\* \* \* \* \*